(12) United States Patent
Toyoda et al.

(10) Patent No.: US 6,333,142 B1
(45) Date of Patent: Dec. 25, 2001

(54) MASTER FOR BARRIER RIB TRANSFER MOLD, AND METHOD FOR FORMING BARRIER RIBS OF PLASMA DISPLAY PANEL USING THE SAME

(75) Inventors: Osamu Toyoda; Akira Tokai; Keiichi Betsui; Akihiro Otsuka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/719,483

(22) PCT Filed: Mar. 1, 1999

(86) PCT No.: PCT/JP99/00991

§ 371 Date: Dec. 13, 2000

§ 102(e) Date: Dec. 13, 2000

(30) Foreign Application Priority Data

Jun. 24, 1998 (JP) .................................................. 10-177305

(51) Int. Cl.[7] ............................... H01J 9/02; B41C 3/08; B41C 3/06; B41F 17/14
(52) U.S. Cl. ............................ 430/320; 430/321; 445/24
(58) Field of Search ................................... 430/320, 321; 445/24; 313/582, 584, 585, 587

(56) References Cited

U.S. PATENT DOCUMENTS

| | | | |
|---|---|---|---|
| 5,609,977 | 3/1997 | Iwamatsu et al. | 430/5 |
| 5,853,446 | * 12/1998 | Carre et al. | 65/17.3 |
| 6,023,130 | * 2/2000 | Sakasegawa et al. | 313/582 |

FOREIGN PATENT DOCUMENTS

| | | |
|---|---|---|
| 01024425 A | 1/1989 | (JP) . |
| 06-150832 | 5/1994 | (JP) . |
| 07-045193 | 2/1995 | (JP) . |
| 07-106220 | 4/1995 | (JP) . |
| 07-134392 | 5/1995 | (JP) . |
| 08273537 | 10/1996 | (JP) . |
| 08-305006 | 11/1996 | (JP) . |
| 09-069335 | 3/1997 | (JP) . |
| 09-134676 | 5/1997 | (JP) . |
| 09-288355 | 11/1997 | (JP) . |
| 09-306345 | 11/1997 | (JP) . |
| 10-125219 | * 5/1998 | (JP) . |
| 10-134705 | 5/1998 | (JP) . |

* cited by examiner

Primary Examiner—John A. McPherson
(74) Attorney, Agent, or Firm—Staas & Halsey LLP

(57) ABSTRACT

The invention relates to a method for forming barrier ribs of a plasma display panel. A master of barrier ribs for fabricating a mold for transferring barrier ribs is easily produced without the use of a machining technique. In the method for forming barrier ribs of a plasma display panel, a light-transmissive substrate having a predetermined pattern of a light-tight material formed on a surface and a photosensitive material layer bonded on the pattern is exposed to light from the rear surface of the light-transmissive substrate and developed so as to fabricate a master in which convex portions in a rib configuration are formed on the light-transmissive substrate. By using the master, a transfer mold for barrier ribs is fabricated. A rib material is filled in concave portions of the transfer mold and transferred onto a substrate for a PDP, thereby forming barrier ribs on the substrate for the PDP.

11 Claims, 12 Drawing Sheets

Exposure

FIG.5(a)
FIG.5(b)
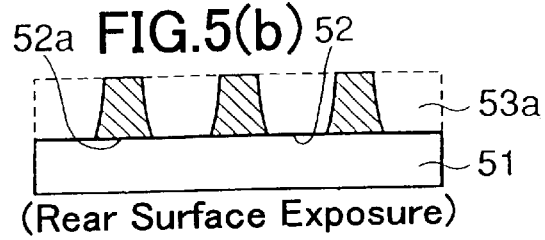
(Rear Surface Exposure)
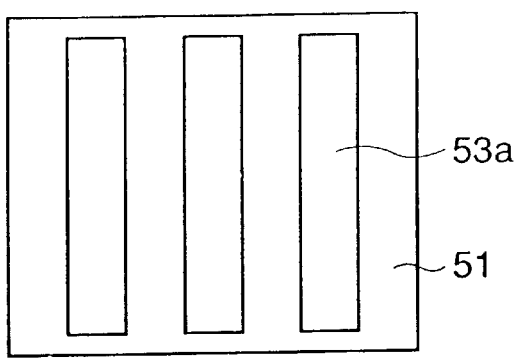
FIG.5(c)
FIG.5(d)
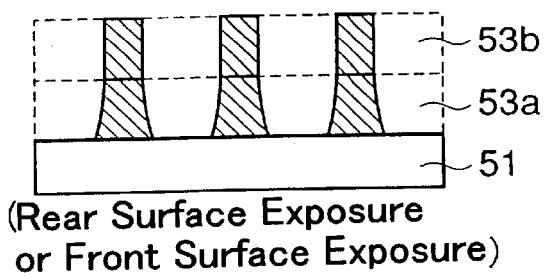
(Rear Surface Exposure or Front Surface Exposure)
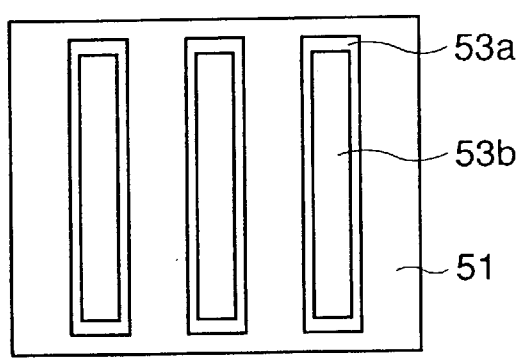
FIG.5(e)
FIG.5(f)
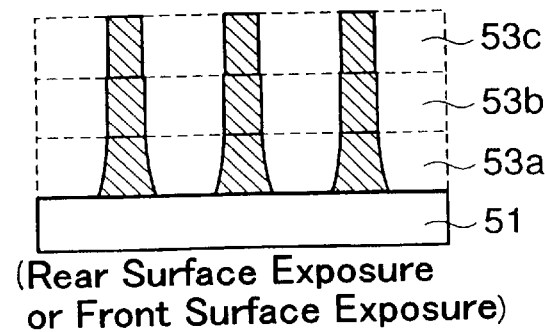
(Rear Surface Exposure or Front Surface Exposure)
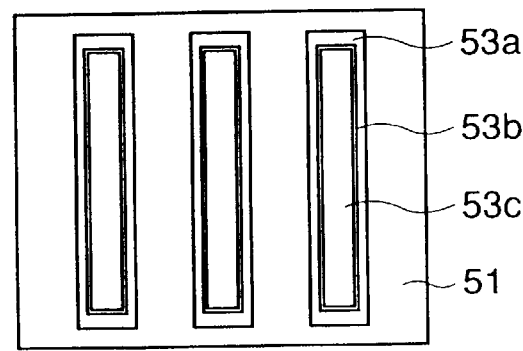

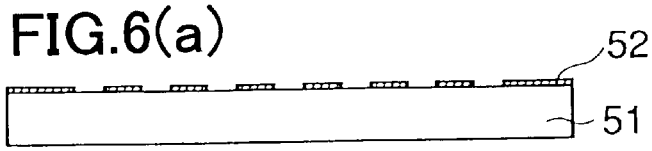
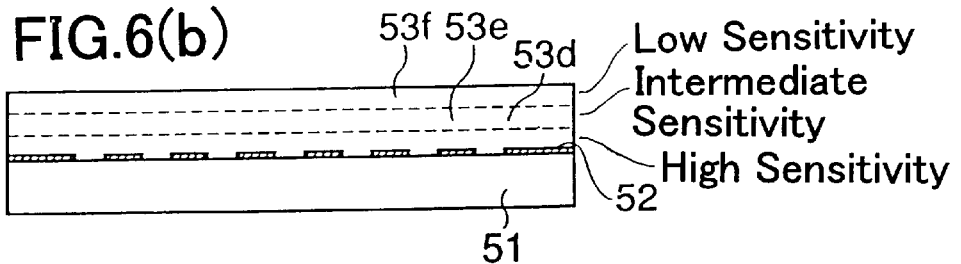
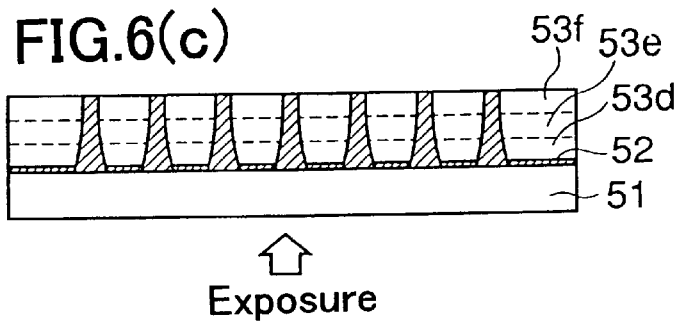
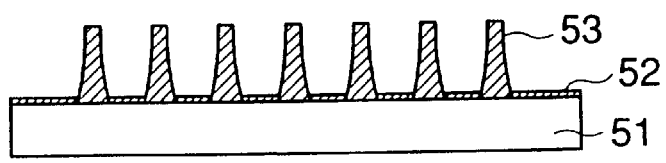
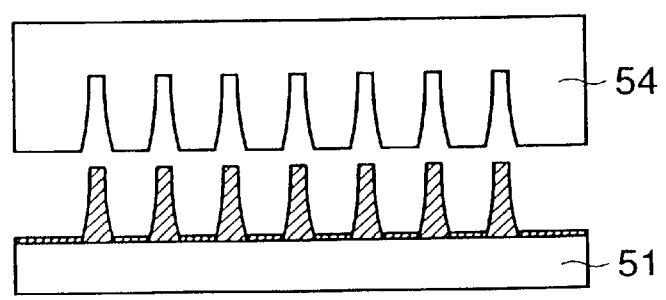

MASTER FOR BARRIER RIB TRANSFER MOLD, AND METHOD FOR FORMING BARRIER RIBS OF PLASMA DISPLAY PANEL USING THE SAME

DESCRIPTION

1. Technical Field

The present invention relates to a master for fabricating a mold for transferring barrier ribs and a method for forming barrier ribs of a plasma display panel (PDP) by using the same. More particularly, the present invention relates to a master for fabricating a mold for transferring barrier ribs, the master having convex portions in a barrier rib configuration, and a method for forming barrier ribs of a plasma display panel (PDP) using the transfer mold fabricated with the master.

2. Background Art

The PDP has been given attention as a display panel (low-profile display device) which exhibits an excellent visibility, and its development has been pursued to a high-definition display and a large screen display to foster its versatility in the field of high-definition display in Japan.

The PDP is a display panel of a self-luminous type which has a discharge space defined by a pair of substrates (typically, glass substrates) spaced a minute distance in an opposing relation with the periphery thereof being sealed.

In general, the PDP has partitions (also referred to as barrier ribs) having a height of about 100 $\mu$m to about 200 $\mu$m provided periodically for partitioning the display space. For example, in a PDP of a surface discharge type suitable for fluorescent color display, barrier ribs which are rectilinear as seen in a plan are equidistantly arranged along data electrode lines. The barrier ribs prevent the interference of discharge and the crosstalk of colors.

Various methods for forming barrier ribs have been proposed and carried out. Typical examples include a screen printing method, a sand blasting method, an additive method (a lift-off method) and a photolithographic method.

The screen printing method is a method of forming barrier ribs by laminating a glass paste on a substrate to a predetermined height by screen printing, followed by firing.

The sand blast method is a method for forming barrier ribs by forming a uniform barrier rib material layer on the entire surface of a substrate, forming a mask having a resistance to sandblast on desired portions of the substrate, thereafter, blowing an abrasive material thereon for cutting portions other than the mask, and after the completion of cutting, removing the mask, followed by firing.

The additive method is referred to also as "embedding method". First, a pattern which is an image of barrier ribs is formed of a photosensitive resist (typically, dry film) on desired sites of a substrate, and a rib material is embedded in gaps between traces of the pattern by using a screen printing method or the like. After the embedding of the rib material, only the photosensitive resist pattern is stripped, and through firing, barrier ribs are formed.

The photolithographic method is a method for forming barrier ribs by coating the entire surface of a substrate with a photosensitive rib paste mixture of a photosensitive resin and a rib material, and exposing and developing a rib pattern. Hitherto, in this method, a thickness of a film which can be exposed at a time is about 20 $\mu$m to about 30 $\mu$m, and therefore exposure and development should be repeated several times to obtain barrier ribs with a desired height.

After the fabrication of a substrate by various methods as mentioned above, the substrate is combined with an opposite substrate and the periphery of the substrates is sealed with a sealing member. A discharge gas is filled in a panel, so that a PDP is completed.

As mentioned hereinabove, various methods have been proposed and performed for the formation of barrier ribs. In any of the methods, however, a large percentage of cost is constituted by indirect materials (a dry film and a rib material to be disposed of) generated in the course of fabrication other than direct materials to form the barrier ribs at a final stage and by consumable items (for example, printing pattern), which prevents the cost reduction.

As a measure for reducing the cost, consideration has been given to a method of forming barrier ribs by transfer. In this method, a model of barrier ribs is produced and, using this model as a master, a mold for barrier ribs is fabricated. Thereafter, a rib material is embedded in the mold and transferred onto a substrate, thereby forming barrier ribs.

If the formation of barrier ribs is intended to be realized by a conventional molding technique, however, it is very difficult to pattern by a machining technique a master for forming barrier ribs (width: 10 $\mu$m–50 $\mu$m, height: 100 $\mu$m–200 $\mu$m, pitch: 100 $\mu$m–400 $\mu$m, area: 0.05 $m^2$–0.5 $m^2$, arrangement of barrier ribs: parallel or crossing arrangement, etc) required for fabrication of a low-profile display device such as a PDP. It is sometimes extremely difficult at the present level of the technique, depending on a configuration of side walls and an arrangement of the barrier ribs.

Under these circumstances, there has been a demand for a method of easily fabricating a master of barrier ribs for production of a mold of barrier ribs, without using the machining technique.

DISCLOSURE OF INVENTION

The inventors of the present invention have found that the aforementioned problem will readily be solved by fabricating a master of barrier ribs using a photosensitive material, producing a transfer mold (negative-type mold) using the master, and transferring a rib material onto a substrate of a PDP with the mold or pressing the mold against the rib material, thereby forming the barrier ribs.

Furthermore, the inventors have found that in the fabrication of the master of barrier ribs, the utilization of rear-surface exposure and multi-stage exposure ensures the control of a taper angle of the barrier ribs (angle formed by the substrate surface and a barrier rib side face) and the adhesion of the photosensitive material to the substrate, so that a master with a controlled configuration can be produced in an increased yield and with ease.

Thus, the present invention provides a master for a barrier rib transfer mold comprising: a light-transmissive substrate having a predetermined pattern formed of a light-tight material on a surface of the substrate and having a photosensitive material layer formed on the pattern; and convex portions in a desired pattern formed on the substrate by exposing the substrate to light from a rear surface of the substrate, followed by developing.

According to the present invention, a master to be used in a transfer method (including a pressing method), which is an economical and simple method of forming barrier ribs, can easily be fabricated with a good yield. Also, the control of the taper angle of barrier ribs and the formation of a pattern such as a lattice which have been extremely difficult by machining processes can be achieved. In addition, the design of the pattern can readily be modified because the pattern is formed basically by photolithography.

Further, since the photosensitive material layer is exposed to light from the rear surface of the substrate, photopolymerization progresses the most in a contact site of the photosensitive material layer to the substrate. Thereafter, the adhesion between the substrate and the photosensitive material is improved, compared to the case where the exposure is performed from the front surface of the substrate.

BRIEF DESCRIPTION OF DRAWINGS

FIGS. 5(a) to (f) are explanatory views illustrating a third embodiment of a method of fabricating a master for production of barrier ribs;

FIGS. 6(a) to (e) are explanatory views illustrating a fourth embodiment of a method of fabricating a master for production of barrier ribs;

BEST MODE FOR CARRYING OUT THE INVENTION

Figure 1:
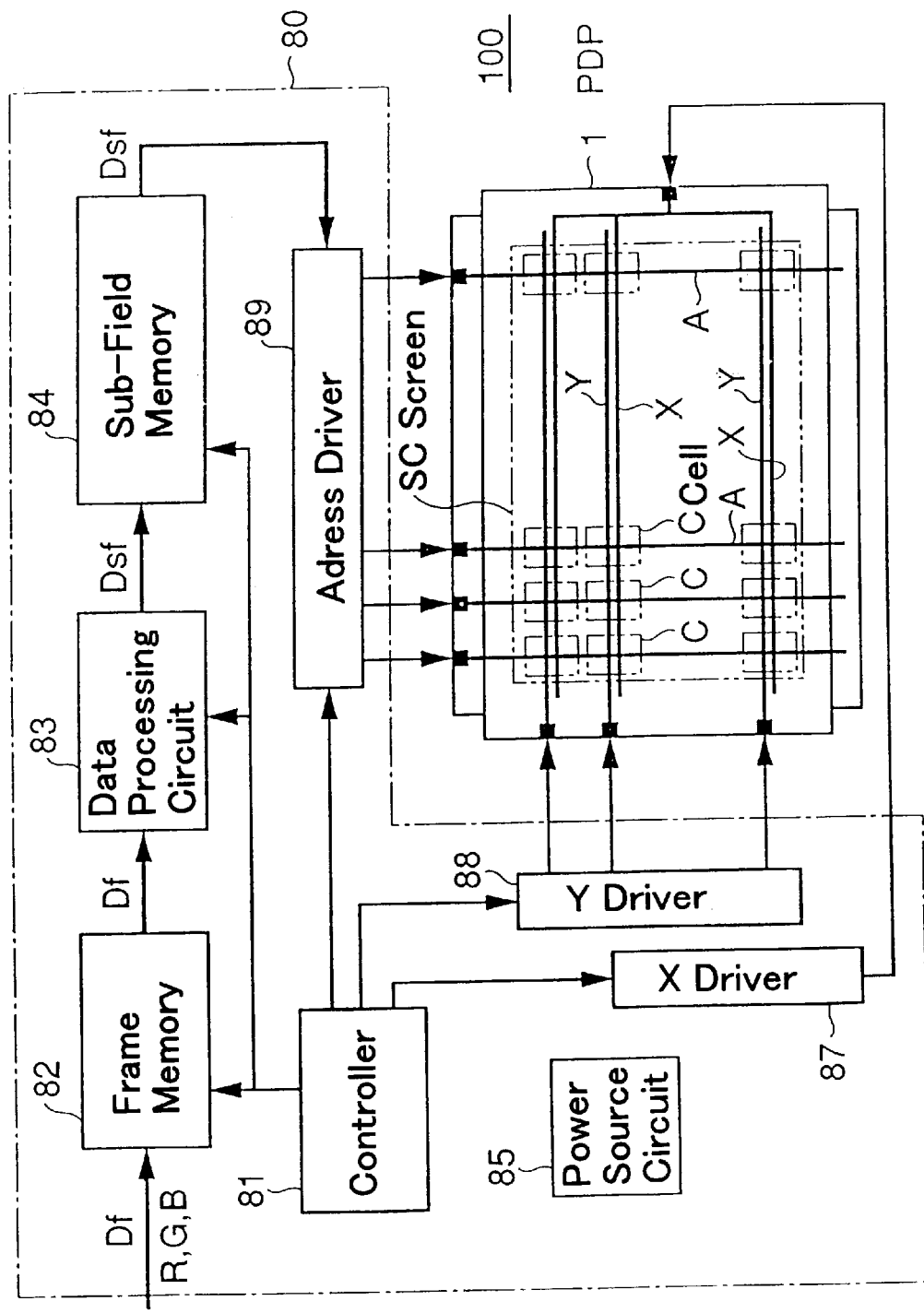
FIG. 1 is a constitutional diagram of a plasma display according to the present invention.

Usable as a light-transmissive substrate in the present invention is any substrate that is transmissive to exposure light, such as a glass substrate or a quartz substrate, for example. Usable as a light-tight material is any material that is not transmissive to the exposure light, such as chromium oxide or various kinds of pigments. The formation of the predetermined pattern is achieved by a known method such as a spattering method using a mask.

A usable photosensitive material for the photosensitive material layer is not particularly limited and can be any known material. For example, a photosensitive material may be mentioned containing a photopolymerizable compound (an acrylate, a methacrylate, urethane diacrylate, urethane dimethacrylate, etc.) having at least one polymerizable unsaturated ethylene-like group in a molecule, a photopolymerization initiator and a binder resin. The photosensitive material layer is formed by applying to the substrate a paste prepared by dissolution or dispersion of the above-mentioned photosensitive material in an appropriate solvent, or by laminating on the substrate the photosensitive material (typically referred to as a dry film resist or DFR in abbreviation) formed in advance into a sheet.

The photosensitive material can be exposed and developed by a conventionally known photolithographic technique. If the photosensitive material is of a negative type, for example, it is possible to form a master for a barrier rib transfer mold having convex portions, for example, in a rib configuration on the substrate by curing exposed portions by exposure and removing unexposed portions by development. In the exposure of the photosensitive material, it is important to perform exposure from the rear surface of the substrate. In other words, the photosensitive material is exposed in such a manner that light for exposure passes through the substrate. Part of the photosensitive material nearer to light is more photopolymerized and less susceptible to a developer, so that a strong adhesion is obtained between the substrate and the photosensitive material. On the other hand, part of the photosensitive material more distant from light is not photopolymerized so much because the light attenuates, and is more susceptible to the developer so as to have a cured area smaller than that of the part nearer to the substrate. Thus, the resulting convex portions of the rib configuration are tapered to have a mountain-like shape.

In the case where a DFR having the same thickness of a height of the barrier ribs is not available, the photosensitive material layer may be formed of a plurality of photosensitive material layers. In this case, the photosensitive material layer may be formed of a plurality of photosensitive material layers different in sensitivity. For example, by locating photosensitive material layers having weaker sensitivity in upper tiers, it is possible to produce a master with an increased taper angle owing to a multiplier effect of a light attenuation and the sensitivity properties possessed by the photosensitive materials. The sensitivity of the photosensitive materials can be controlled by the selection of polymerization initiator and monomers and the dispersion of pigments.

Further, a reflectance adjustment member may be disposed on the photosensitive material layer to control the degree of exposure of a desired site of the photosensitive material layer during the exposure and adjust the configuration of the photosensitive material layer after the development.

By an alternative method, the convex portions can also be formed on the substrate by forming a first photosensitive material layer on a first pattern previously formed of a light-tight material on a surface of the substrate, followed by exposure from the rear surface of the substrate; without development, forming a second photosensitive material layer on the first photosensitive material layer; arranging a photolithographic mask having a second pattern overlying the first pattern on the second photosensitive material layer and exposing the second photosensitive material layer; repeating steps from the formation of the second photosensitive material layer a predetermined times; and developing all the photosensitive material layers. This method enables the configuration of the side walls of the convex portions to be easily adjusted in the design.

In this case, a translucent filter film may be formed for adjusting the amount of light during the exposure of the photosensitive material layers, on a region of the surface of the substrate where the first pattern is not formed. Where the taper angle of the barrier rib is intended to be controlled, for example, a filter film having a pigment dispersed therein may be formed on portions in which a reduced amount of light for exposure is desired, so as to control the taper angle of the barrier ribs. The filter film may have gradations such that it is thinner at the center of the barrier rib while it is thicker at edges of the barrier rib.

By a further alternative method, the convex portions may be formed on the substrate by forming a first photosensitive material layer on a first pattern of a light-tight material previously formed on the surface of the substrate; arranging a photolithographic mask having such a second pattern that overlies the first pattern and allows a larger region to be exposed than the first pattern on the first photosensitive material layer and exposing the first photosensitive material layer; without development, forming a second photosensitive material layer on the first photosensitive material layer and exposing the second photosensitive material from the rear surface of the substrate; and developing all the photosensitive material layers.

The present invention also provides a method for forming barrier ribs of a plasma display panel, comprising: fabricating a mold for transferring barrier ribs using the above-described master for the barrier rib transfer mold, filling concave portions of the transfer mold with a rib material, and transferring the rib material onto a substrate for the plasma display panel.

In the present invention, the master for the barrier rib transfer mold is used to fabricate the mold for transferring barrier ribs, and a rib material is filled in the concave portions of the transfer mold and transferred onto the substrate for the plasma display panel. The transfer mold can be fabricated by copying the master using a silicone rubber or the like. The transfer of the rib material onto the substrate for the plasma display panel can be carried out by embedding a dielectric paste as the rib material in the concave portions of the transfer mold of the silicone rubber and transferring the rib material onto the substrate for the PDP itself, thereby forming the barrier ribs on the substrate for the PDP. The transfer mold may be formed of a rigid resin or by way of electroforming, and may be used as a pressing mold to be pressed against the dielectric rib material to obtain barrier ribs.

From the standpoint of a removal property during the transfer of the rib material, it is desirable that the convex portions of the master for the barrier rib transfer mold are configured such that end portions of the barrier ribs have a larger area than main portions of the barrier rib when the rib material is transferred using the transfer mold.

Further, the master for the barrier rib transfer mold may be formed in such a shape that its convex portions are formed of a plurality of photosensitive material layers in which a photosensitive material layer situated in an upper tier has a smaller area than a photosensitive material layer situated in a lower tier, so that when the barrier rib material is transferred using the transfer mold, the end portions of the barrier ribs in a longitudinal direction are lower than the main portions of the barrier ribs.

Alternatively, the master for the barrier rib transfer mold may be formed in such a shape that its convex portions are formed of a plurality of photosensitive material layers in which a photosensitive material layer situated in an upper tier has a smaller area than a photosensitive material layer situated in a lower tier and the photosensitive material layer situated in the lower tier has a larger area at sites corresponding to the end portions of the barrier ribs than at sites corresponding to the main portions thereof, so that when the barrier rib material is transferred using the transfer mold, the end portions of the barrier ribs has a larger area than the main portions thereof and the end portions of the barrier ribs are lower than the main portions thereof.

Further, the master for the barrier rib transfer mold may be formed in such a shape that its convex portions are formed of a plurality of photosensitive material layers in which a photosensitive material layer situated in an upper tier has a smaller area than a photosensitive material layer situated in a lower tier and, in the photosensitive material situated in the lower tier, only the sites corresponding to the end portions of the barrier ribs are continuously connected, so that when the barrier rib material is transferred using the transfer mold, the end portions of the barrier ribs are continuously connected and the end portions of the barrier ribs are lower than the main portions thereof.

The present invention will now be explained in detail based on embodiments shown in the drawings. It should be understood that the present invention is not limited to the embodiments.

FIG. 1 is a constitutional diagram of a plasma display according to the present invention.

A plasma display 100 comprises an AC-driven PDP 1 as a color display device employing a matrix display system and a drive unit 80 for selectively lighting cells C arranged lengthwise and crosswise which constitute a screen SC. The plasma display apparatus 100 is utilized as wall-mount TVs, monitors of computer systems, etc.

The PDP 1 is a three-electrode type surface discharge PDP in which pairs of sustain electrodes X and Y as first and second electrodes for main discharge are arranged parallel to each other and orthogonal to address electrodes A as third electrodes. The sustain electrodes X and Y extend in a line direction (in a horizontal direction) in the screen. The sustain electrodes Y are used as scan electrodes for selecting cells C line by line during addressing. The address electrodes A extend in a column direction (in a perpendicular direction) and are used as data electrodes for selecting cells C column by column. The area where the group consisting of the sustain electrodes and the group consisting of the address electrodes intersect is a display area, i.e., the screen SC.

The driver unit 80 includes a controller 81, a frame memory 82, a data processing circuit 83, a sub-field memory 84, a power source circuit 85, an X driver 87, a Y driver 88 and an address driver 89. Into the driver unit 80 is input field data Df for each pixel indicating luminous level (gradation level) of each color of R, G and B from an external device such as a TV tuner or a computer, together with synchronous signals of various types.

The field data Df is once stored in the frame memory 82, and then sent to the data processing circuit 83. The data processing circuit 83 is a data transforming means which divides one field into a predetermined number of sub-fields for gradation display, sets a combination of sub-fields to be lit among the predetermined number of sub-fields and outputs sub-field data Dsf corresponding to the field data Df. The sub-field data Dsf is stored in the sub-field memory 84. The value of each bit of the sub-field data Dsf provides information indicating whether or not a cell needs to be lit in a sub-field, more specifically requirement or non-requirement of an address discharge.

The X driver 87 applies driving voltage to the sustain electrodes X and the Y driver 88 applies driving voltage to the sustain electrodes Y. The address driver 89 applies driving voltage to the address electrodes A in accordance with the sub-field data Dsf. The power supply circuit 85 supplies these drivers with a predetermined amount of power.

Figure 2:
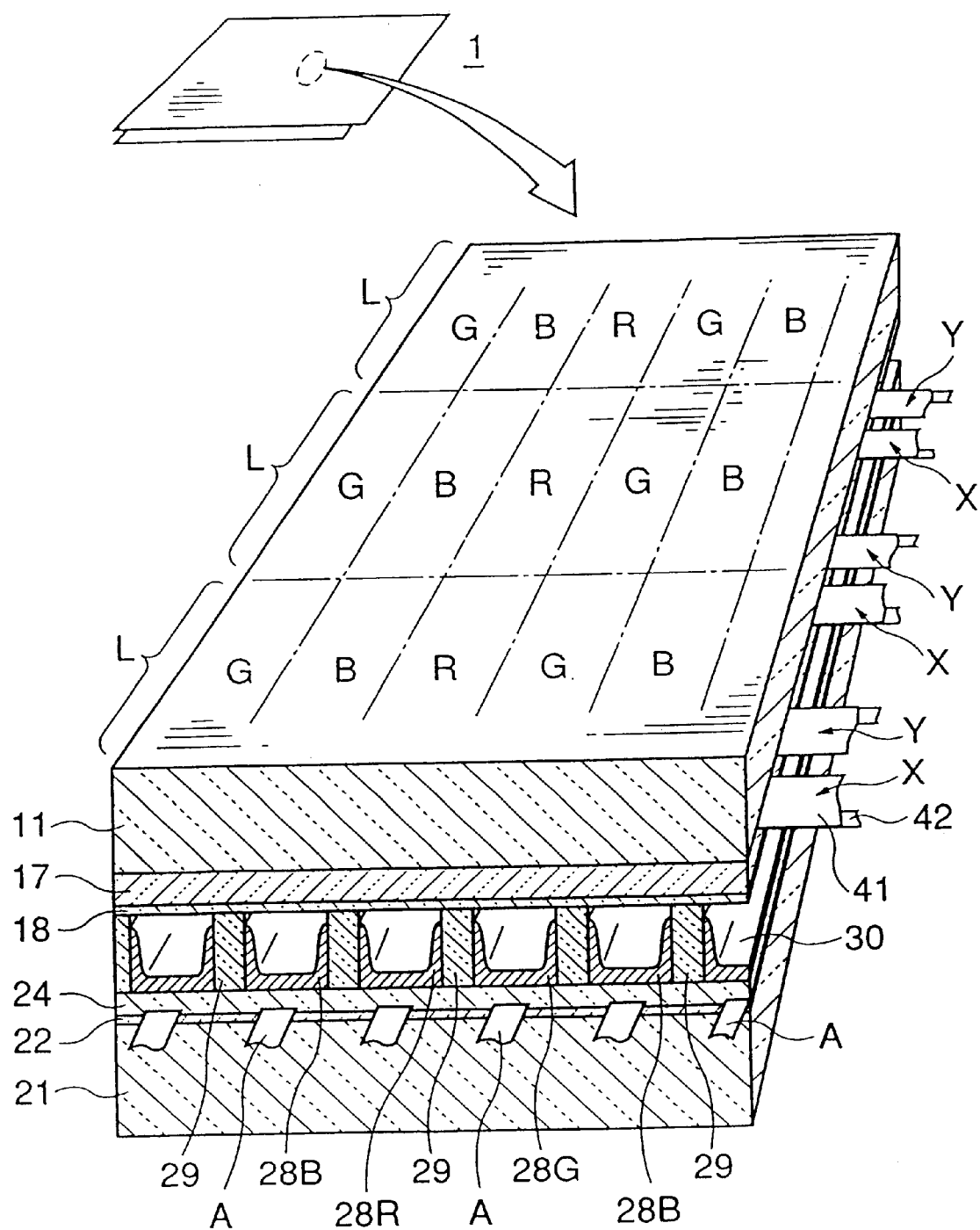
FIG. 2 is a perspective view illustrating the internal construction of a PDP.

FIG. 2 is a perspective view illustrating the internal structure of the PDP.

In the PDP 1, a pair of sustain electrodes X and Y is provided on every line L on an interior surface of a front glass substrate 11. Line L is a row of cells in the horizontal direction on the screen. The sustain electrodes X and Y are each formed of a transparent conductive film 41 of ITO and a metal film (bus conductor) 42 of Cr—Cu—Cr, and are covered with a dielectric layer 17 of low-melting point glass having a thickness of about 30 $\mu$m. A protection film 18 of magnesium oxide (MgO) having a thickness of angstroms of several thousands is provided on the surface of the dielectric film 17. The address electrodes A are arranged on an underlying layer 22 which covers an interior surface of a rear glass substrate 21, and covered with a dielectric layer 24 having a thickness of about 10 $\mu$m. Barrier ribs 29 each having a linearly elongate configuration in plan and a height of 15$\mu$m are provided between the respective address electrodes A. The barrier ribs 29 partition an electric discharge space 30 on a subpixel-by-subpixel (unit luminous area) basis in the line direction and define the height of the electric discharge space 30. Three color (R, G and B) fluorescent layers 28R, 28G and 28B for color display are respectively provided to cover interior surfaces of the rear substrate including surfaces above the address electrode A and side surfaces of the barrier ribs 29. The layout pattern of three colors is a strip pattern in which cells in one column have the same luminescent color and adjacent columns have different luminescent colors. In the formation of the barrier ribs, it should be desirable that top portions of thereof are colored dark and the other portions thereof are colored white for improvement of reflectance of visible light, thereby enhancing contrast. The coloring of the barrier ribs is carried out by adding a pigment of a predetermined color to a glass paste serving as a material.

A discharge space 30 is filled with a discharge gas of a mixture of xenon with neon as a main component (an enclosure pressure of 500 Torr), and the fluorescent layers 28R, 28G and 28B are locally excited by ultraviolet light emitted from xenon during an electric discharge and emit light. Each pixel (picture element) for display is constituted by three subpixels along the line L. A structural body within each subpixel is a cell (display element) C. The barrier ribs 29 are arranged in a stripe pattern and, therefore, column sections of the discharge space 30 corresponding to the respective columns are each continuous in the column direction across all the lines. For this reason, an interelectrode spacing between adjacent lines L (referred to as a reverse slit) is selected to be a value (for example, a value within the range of 200 $\mu$m–500 $\mu$m) which is sufficiently larger than a surface discharge gap of each line L (for example, a value within the range of 80 $\mu$m–140 $\mu$m) and prevent discharge coupling from generating in a column direction. A light-tight film, not shown, is provided on either the front surface or the rear surface of the substrate 11 for the purpose of screening a non-luminous whitish fluorescent layer of the reverse slit.

FIGS. 3(a)–(h) are explanatory views illustrating a first embodiment of a method of fabricating a master for formation of barrier ribs.

In accordance with the method of forming barrier ribs of present invention, first, a master of barrier ribs is fabricated for production of a mold for transferring barrier ribs.

Figure 3A:
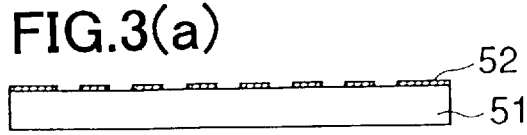
FIGS. 3(a) to (h) are explanatory views illustrating a first embodiment of a method of fabricating a master for formation of barrier ribs.

In the fabrication of the master, a negative-type pattern of the barrier ribs is formed of a light-tight material (for example, a thin chromium film) 52 on a substrate 51 of glass (see FIG. 3(a)). The substrate 51 may also be made of any other material that transmits light such as quartz or the like. The formation of the negative-type pattern of barrier ribs is carried out by spattering, for example.

On the pattern of the light-tight material 52, is formed a negative-type photosensitive material (for example, a dry film resist, hereinafter referred to as a DFR) 53 of which portions exposed to light is cured to remain (see FIG. 3(b)). In use of the DFR as the photosensitive material 53, the DFR is laminated so that a substrate of a PDP will have barrier ribs with a desired height since the DFR has a thickness of about 50 $\mu$m to about 100 $\mu$m.

Figure 3F:
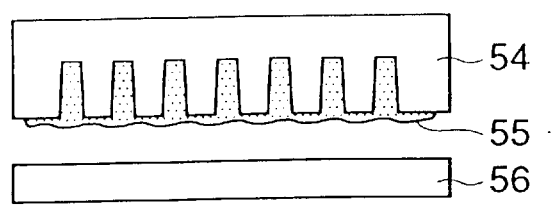
Figure 3B:
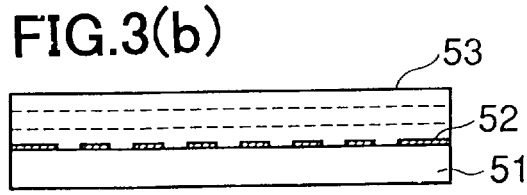
Figure 3G:
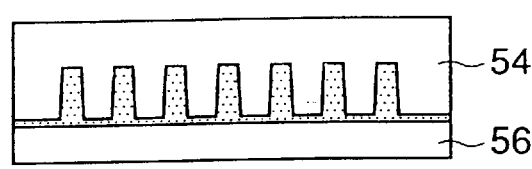
Figure 3C:
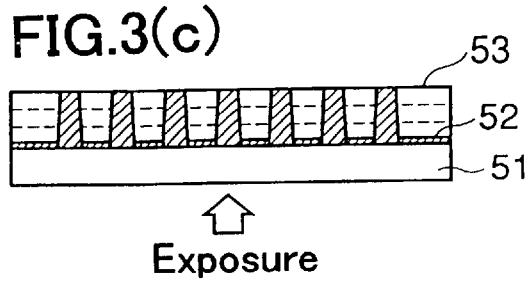
Figure 3H:
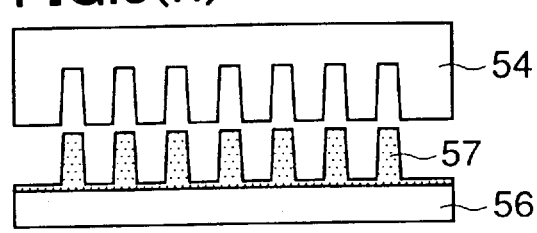
Figure 3D:
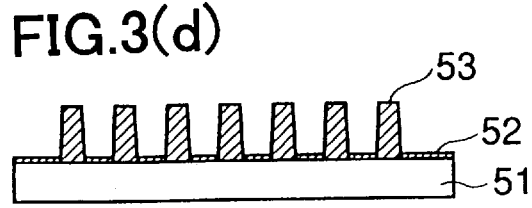

Next, the substrate 51 is exposed from the rear surface thereof (see FIG. 3(c)), and the photosensitive material 53 is exposed via the negative-type pattern of the light-tight material 52 and developed (see FIG. 3(d)). By doing this, photopolymerization progresses much at a portion of the photosensitive material 53 nearer to light, and therefore the adhesion of the photosensitive material 53 to the substrate 51 is drastically enhanced so that the stability in fabrication is ensured. Also, as applied light advances farther, it attenuates more, so that a portion intended to be a top portion of the barrier rib finally has a virtually lower degree of polymerization and therefore becomes narrower during development, thereby forming the barrier rib having an intentionally controlled taper. It is to be noted that since the control of the taper of this type and the degree of stability in fabrication depend on the required specs of the barrier ribs, the exposure from the rear surface is not necessarily required and in some cases it is possible to expose from the front surface.

Figure 3E:
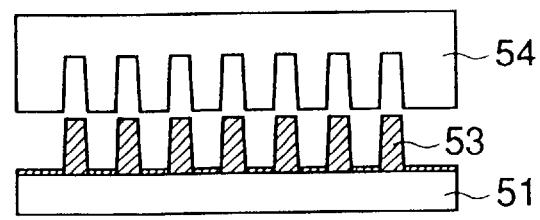

The master of barrier ribs fabricated as described above is copied using a silicone rubber or the like to form a transfer mold 54 (see FIG. 3(e)), a dielectric paste 55 as a rib material is embedded in concave portions of the mold 54 (see FIG. 3(f)) and transferred onto a substrate 56 of the PDP itself (see FIG. 3(g)), thereby giving desired barrier ribs 57 (see FIG. 3(h)).

Alternatively, the aforementioned mold 54 can be formed of a rigid resin or by electroforming, and pressed as a pressing mold against the dielectric rib material, so that desired barrier ribs are obtained. It is to be noted that the substrate having the rib pattern formed of the photosensitive material may be used as a master as it is or may be used as an intermediate for repeated transfer with other resins or for production of a mold by electroforming.

It is to be noted that if an electrode pattern of the PDP (pattern of the address electrodes A shown in FIG. 2) per se is utilized as the negative-type pattern of the light-tight material 52 and a photosensitive rib material is used as the photosensitive material 53, it is possible to form barrier ribs self-aligned with the electrodes A (not requiring positioning) without using the transfer method.

Here, if the light attenuation rate of the photosensitive rib material is the point at issue, the exposure may be performed at every formation of a photosensitive rib material layer, and all the photosensitive barrier rib layers may subsequently be developed at once.

More specifically, first, the negative-type pattern of barrier ribs is formed on the substrate, and a first photosensitive rib material layer is formed thereon and exposed from the rear surface so that the adhesion of the first photosensitive rib material layer to the substrate is enhanced. Next, without development, a second photosensitive rib material layer is formed on the first photosensitive rib material layer, and a negative-type pattern of the barrier ribs is formed thereon and the second photosensitive rib material layer is exposed from the front surface thereof via the negative-type pattern. A third photosensitive rib material layer is formed on the second photosensitive rib material layer and exposed from the front surface thereof in the same manner. The above steps are repeated and all the photosensitive rib material layers are developed in order to form barrier ribs.

Figure 4A:
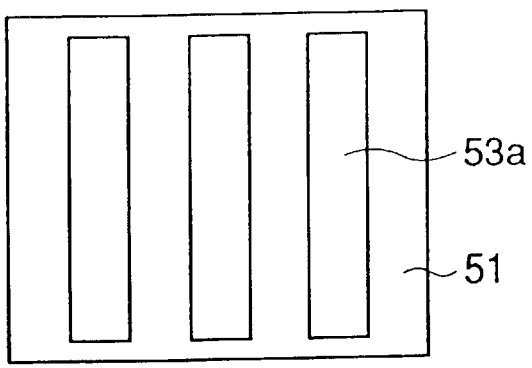
FIGS. 4(a) to (f) are explanatory views illustrating a second embodiment of a method of fabricating a master for production of barrier ribs.
Figure 4B:
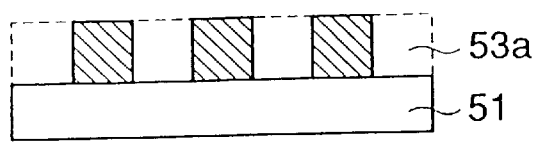
Figure 4C:
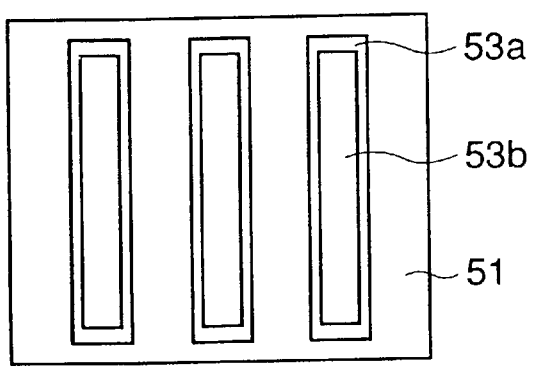
Figure 4D:
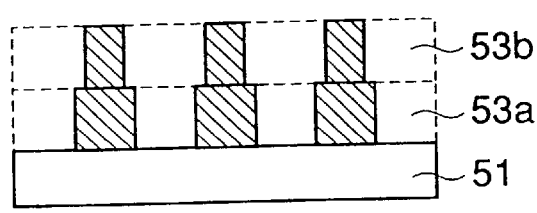
Figure 4E:
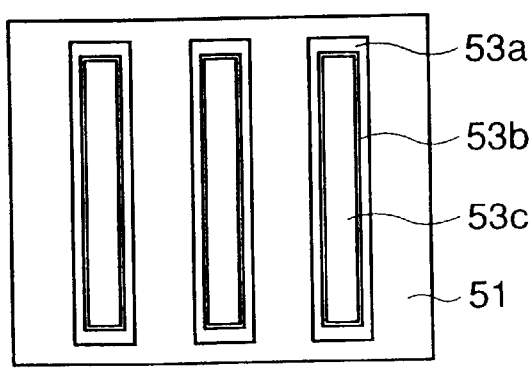
Figure 4F:
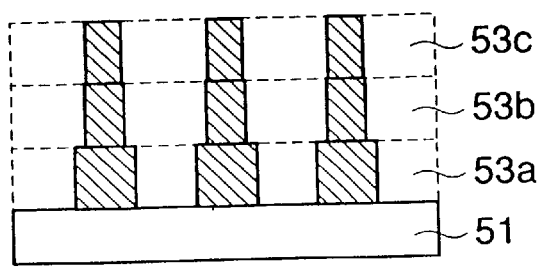

FIGS. 4(a) to (f) are explanatory views illustrating a second embodiment of a method of fabricating a master for production of barrier ribs. FIGS. 4(a), (c) and (e) are plan views, FIG. 4(b) is a side view of FIG. 4(a), FIG. 4(d) is a side view of FIG. 4(c), and FIG. 4(f) is a side view of FIG. 4(e).

In the present embodiment, to give positive control to the taper of the barrier rib, the photosensitive material layer is formed by forming several layers so that, at every formation of a layer, exposure is performed using an exposure pattern smaller than (pattern similar to) that used in the previous formation.

For example, the photosensitive material layer is formed of the three layers by forming a first photosensitive material layer 53a on the substrate 51; forming a negative-type pattern of barrier ribs thereon and exposing the substrate from the front surface (see FIGS. 4(a) and (b)) but not developing; forming a second photosensitive material layer 53b and exposing from the front surface thereof using a narrower pattern than the previous pattern (see FIGS. 4(c) and (d)) but not developing; next, forming a third photosensitive material layer 53c, and exposing from the front surface thereof using a further narrower pattern (see FIGS. 4(e) and (f)). It is to be noted that in the above description the first photosensitive material layer 53a is exposed from the front surface thereof but it is also possible that the negative-type pattern of the barrier ribs is formed in advance on the substrate 51 of a light-transmissive material and the exposure from the rear surface is carried out.

By developing all the photosensitive material layers which have been exposed, the master with a tapered rib configuration can be formed. Steps caused by differences in width of the exposure patterns for the respective photosensitive material layers 53a, 53b and 53c can be reduced to some extent by post-exposure baking (PEB).

From the master of the barrier ribs thus obtained, a transfer mold is fabricated in the same manner as in the first embodiment, and a dielectric past as a rib material is embedded in concave portions of the mold and transferred onto the substrate of the PDP so that desired barrier ribs can be obtained.

FIGS. 5(a) to (f) are explanatory views illustrating a third embodiment of a method of fabricating a master for production of barrier ribs. FIGS. 5(a), (c) and (e) are plan views, FIG. 5(b) is a side view of FIG. 5(a), FIG. 5(d) is a side view of FIG. 5(c), and FIG. 5(f) is a side view of FIG. 5(e). Each drawing illustrates the corresponding contents shown in FIGS. 4 (a) to (f) as mentioned above.

In the present embodiment, in the formation of the negative-type rib pattern of the light-tight material 52 on the light-transmissive substrate 51, filter portions 52a with a pigment dispersed are formed on portions in which attenuation of light is especially desired (in the present embodiment, portions corresponding to barrier ribs) while the other portions are covered with the usual light-tight material 52, so that the taper angle of the barrier ribs is further controlled. The filter portions 52a may have gradations such that the pigment is thin at the center of the barrier ribs while it is thick at the edge portions. This filter has effect only at the exposure of from the rear surface, and therefore it is more effective to use this filter in combination with the second embodiment.

The fabrication of the transfer mold using the master of barrier ribs and the transfer of the barrier ribs using the transfer mold are carried out in the same manner as in the first and second embodiments.

FIGS. 6(a) to (e) are explanatory views illustrating a fourth embodiment of a method of fabricating a master for production of barrier ribs.

In the present embodiment, the taper angle of the barrier rib is controlled by using photosensitive materials different in the photosensitivity. For example, on the substrate 51 having a pattern of the light-tight material 52 (see FIG. 6(a)), are formed a photosensitive material 53d having a high sensitivity, a photosensitive material 53e having an intermediate sensitivity and a photosensitive material 53f having a low sensitivity in this order (see FIG. 6(b)), and exposed from the rear surface (see FIG. 6(c)) and developed (see FIG. 6(d)). This allows the effect of light attenuation and the sensitivity properties intrinsically possessed by the photosensitive materials 53d, 53e and 53f to produce the multiplier effect so that the master mold has a large taper angle. It is to be noted that the sensitivity of the photosensitive materials can be controlled by the selection of polymerization initiators, monomers and the like and the dispersion of pigments.

The master of barrier ribs obtained as mentioned above is copied by using a silicone rubber or the like in the same manner as in the first to the third embodiment to fabricate a master mold 54 (see FIG. 6 (e)). A dielectric paste is embedded in the concave portions of the master mold and transferred onto a substrate of the PDP to obtain desired barrier ribs.

Alternatively, as in the embodiment illustrated in FIGS. 3, the transfer mold 54 can be formed of a rigid resin or by electroforming, and pressed as a pressing mold against the dielectric rib material, so that desired barrier ribs are obtained. In this case also, as mentioned above, the substrate having the rib pattern formed of the photosensitive material may be used as a master as it is or may be used as an intermediate for repeated transfer with other resins or for production of a mold by electroforming.

Incidentally, also in the present embodiment, as explained in the embodiment shown illustrated in FIG. 3, if an electrode pattern of the PDP per se is utilized as the negative-type pattern of the light-tight material 52 and a photosensitive rib material is used as the photosensitive material 53, it is possible to form barrier ribs self-aligned with the electrodes without using the transfer method.

Figure 7:
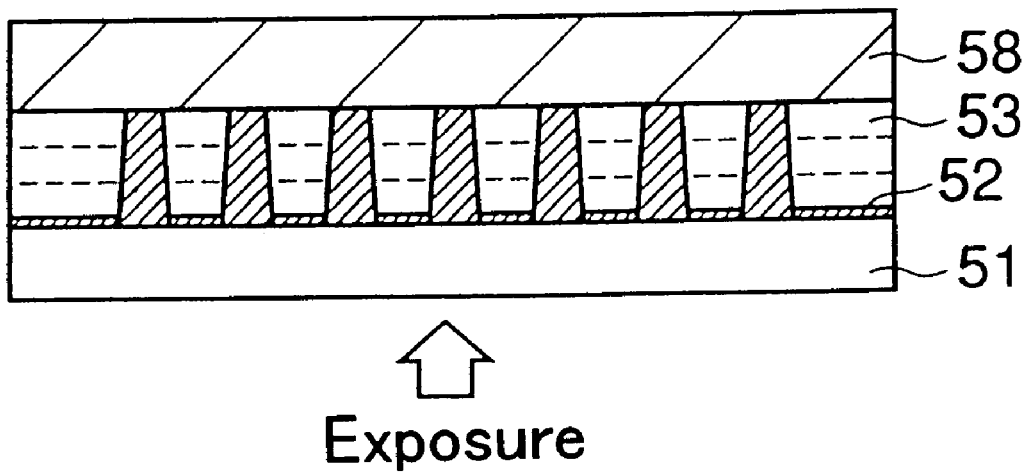
FIG. 7 is an explanatory view illustrating a fifth embodiment of a method of fabricating a master for production of barrier ribs.

FIG. 7 is an explanatory view illustrating a fifth embodiment of a method of fabricating a master for production of barrier ribs.

The present embodiment can be applied to the first and fourth embodiments which use the rear-surface exposure. In the present embodiment, in the exposure from a rear surface, a light absorbent material 58 is disposed as a reflectance adjustment material on the photosensitive material layer 53. In other words, a substance having desired reflectance is disposed on or applied to the photosensitive material layer 53, so that light reflectance is controlled in order to adjust the photopolymerization degree of a surface of the photosensitive material 53 and thereby control the pattern configuration. For example, if the light absorbent material 58 is black, it absorbs light and the polymerization degree of the photosensitive material 53 is lowered to form a rib pattern with a narrow top, and if the light absorbent material 58 is a substance scattering white color, halation is generated and the polymerization degree of the photosensitive material 53 is enhanced to form a rib pattern with a wide top.

The fabrication of a transfer mold using the master of barrier ribs and the transfer of barrier ribs using the transfer mold are carried out in the same manner as in the first to fourth embodiment.

Figure 8A:
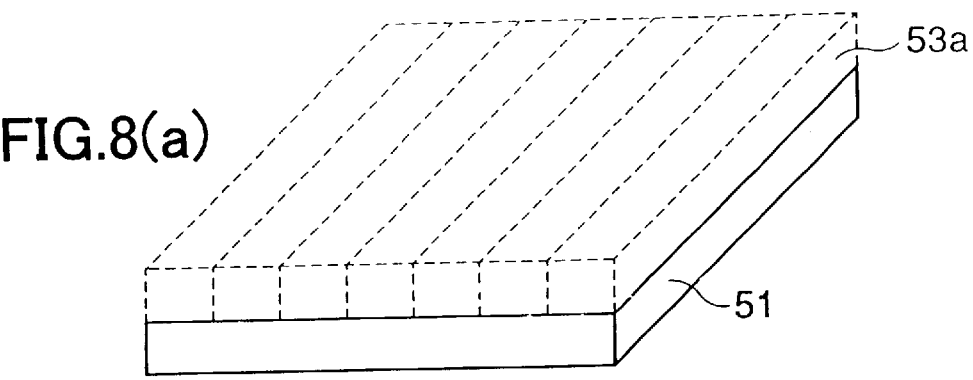
FIGS. 8(a) to (c) are explanatory views illustrating a method of laminating photosensitive material layers.
Figure 8B:
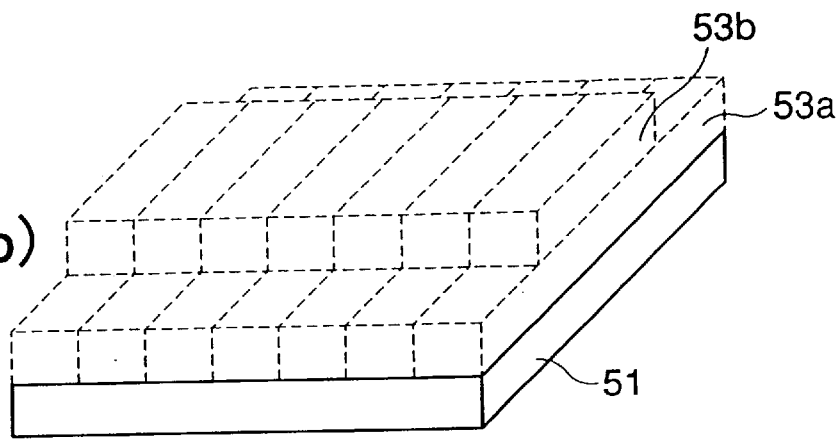
Figure 8C:
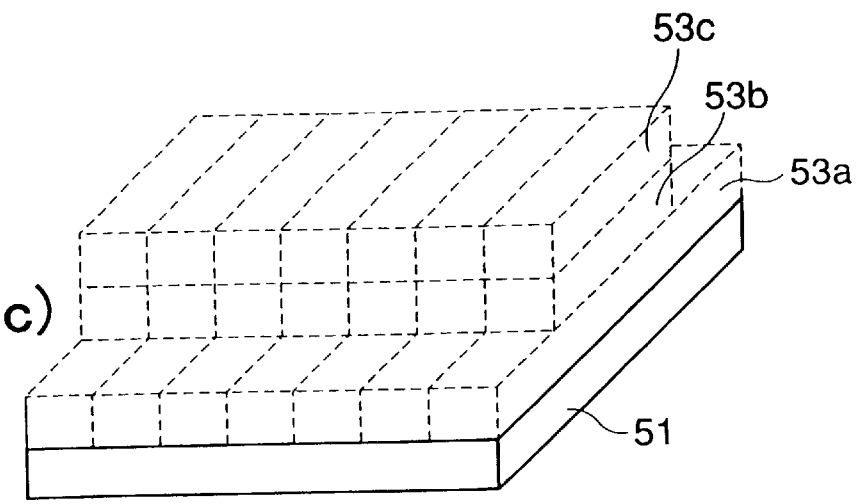

FIGS. 8(*a*) to (*c*) are explanatory views illustrating a method of laminating photosensitive material layers.

The aforementioned formation methods of barrier ribs of the first to the fifth embodiment utilize at a final step a transfer method for the formation of barrier ribs. Accordingly, in these embodiments, the removal property from the transfer mold is a fundamental point at issue. This removal property greatly depends on the taper angle of the barrier ribs and the most important is the taper at the end portion of the pattern. Since transfer starts at the end portion of the pattern, it is better that the end portion has a larger taper and it is further preferred that the end portion is so thin that the portion at which the transfer starts is easily transferred.

Thus, at first, a first photosensitive material layer 53*a* is formed on the substrate 51 to have the same size as that of the substrate 51 and exposed (see FIG. 8(*a*)). Next, a second photosensitive layer 53*b* is formed on the first photosensitive material layer 53*a* to be shorter at both ends in an extending direction of the barrier ribs and exposed (see FIG. 8(*b*)). Then, a third photosensitive material layer 53*c* is formed on the second photosensitive material layer 53*b* to have the same size as that of the second photosensitive material layer 53*b* and exposed (see FIG. 8(*c*)). That is, only the first photosensitive material layer 53*a* has a larger formation area, and the subsequently formed second and third photosensitive material layers 53*b* and 53*c* each have a smaller formation area.

In this manner, it is possible to form a master having a shallow shape only at the end portion of the pattern by forming thin only the photosensitive material at the end portion of the pattern so that the shape of the end portion of the pattern is shallow.

Figure 9:
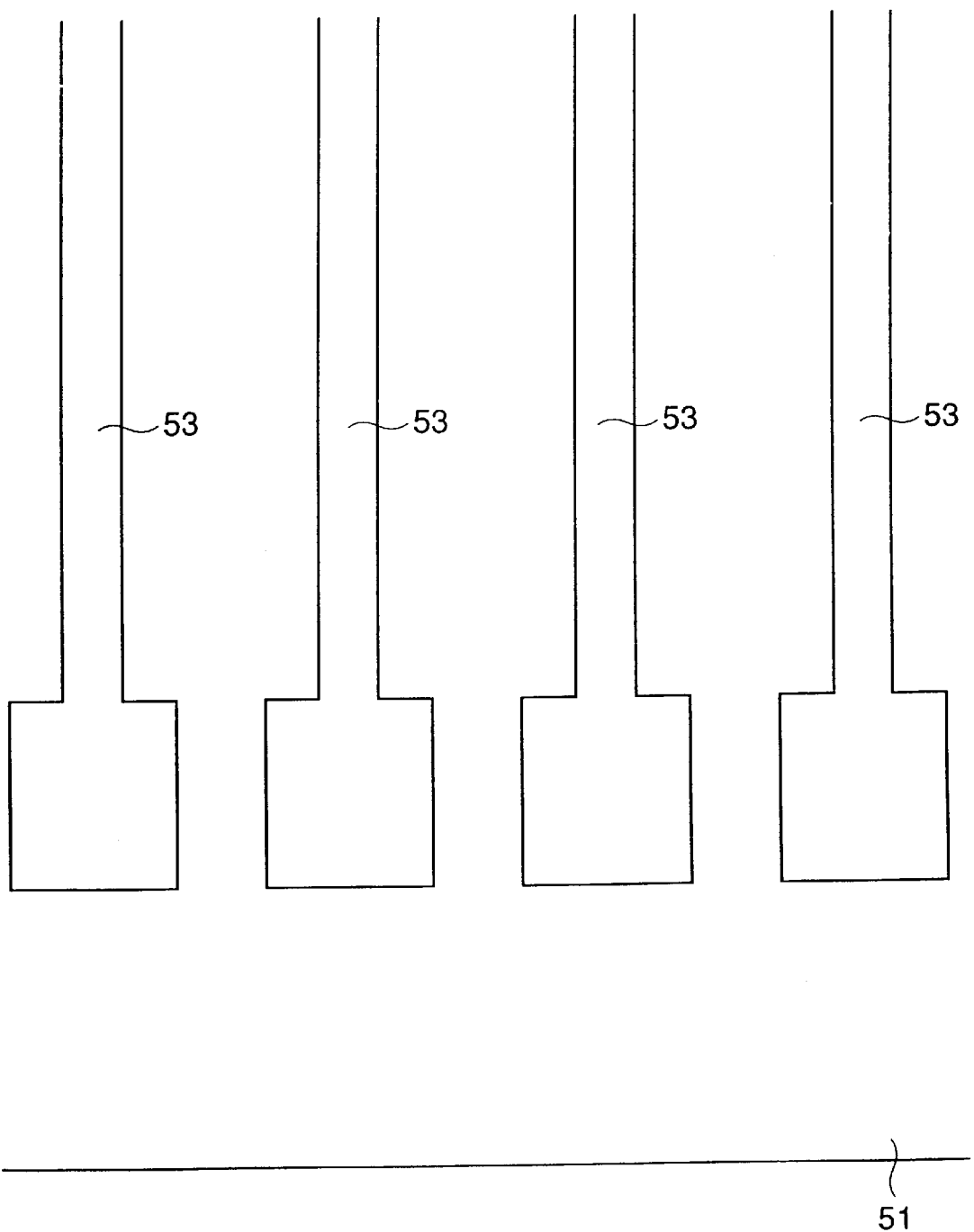
FIG. 9 is an explanatory view illustrating an example of the configuration of an end portion of a rib pattern formed of a photosensitive material.
Figure 10A:
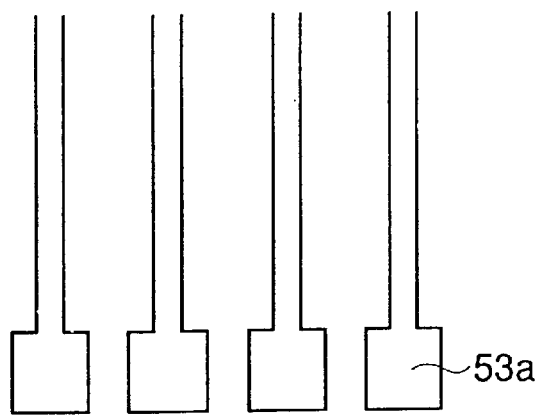
FIGS. 10(a) and (b) are explanatory views illustrating an example of the configuration of an end portion of a rib pattern formed of a photosensitive material.
Figure 10B:
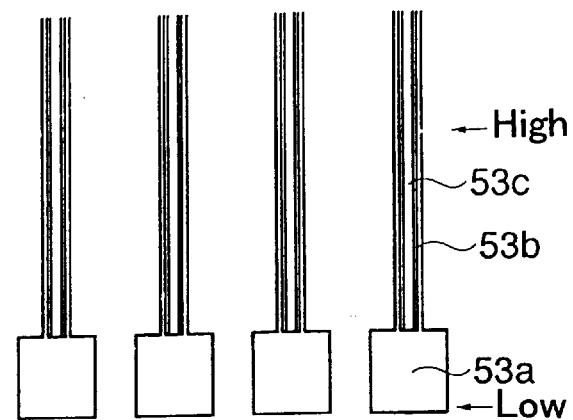

FIGS. 9, 10(*a*) and (*b*), and 11(*a*) and (*b*) are views illustrating examples of the configuration of the end portion of the rib pattern formed of the photosensitive material.

FIG. 9 also shows an example of a rib pattern in which the transfer property is improved. As illustrated, if the end portion of the rib pattern formed of the photosensitive material 53 is wider than the main portion of the rib pattern, the contact area is increased, resulting in improvement of the transfer property.

FIGS. 10(*a*) and (*b*) illustrates an improved embodiment of FIG. 9, in which the end portions of the rib pattern are wider and lower than the main portions thereof. Such a master further improves the transfer property.

A method of forming this master employs multi-stage exposure in which a plurality of photosensitive material layers are laminated and exposed a plurality of times for the formation of the photosensitive material layers 53*a*, 53*b* and 53*c* with application of the laminating method illustrated in FIG. 8.

For example, the photosensitive material layers are formed layer by layer three times by forming a first photosensitive material layer 53*a*; exposing it with a pattern in which intended feet of the barrier ribs, i.e., the main portions and end portions are wide (see FIG. 10(*a*)); without development, forming a second photosensitive material layer 53*b* thereon; superposing a pattern having no end portions thereon, followed by exposure but not development; forming a third photosensitive material layer 53*c* thereon; and superposing a pattern narrower than the pattern for the second photosensitive material layer 53*b*, followed by exposure (see FIG. 10(*b*)). After completion of exposure of all the photosensitive material layers, development is performed to give the master having desired barrier ribs.

Figure 11A:
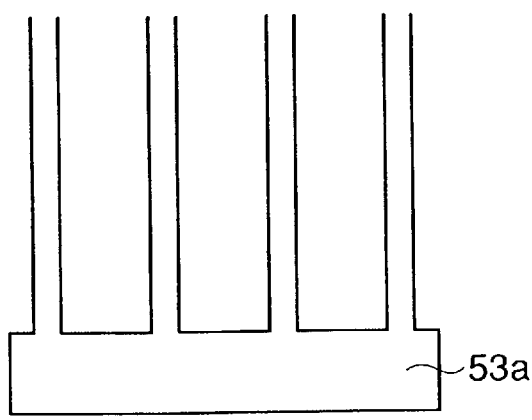
FIGS. 11(a) and (b) are explanatory views illustrating an example of the configuration of an end portion of a rib pattern formed of a photosensitive material.
Figure 11B:
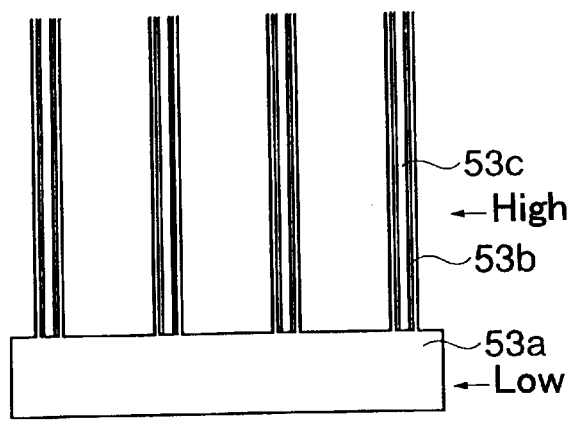
Figure 12A:
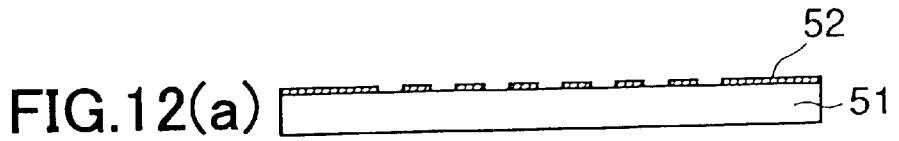
FIGS. 12(a) to (g) are explanatory views illustrating a method of fabricating a master in which the property of transfer is improved.
Figure 12B:
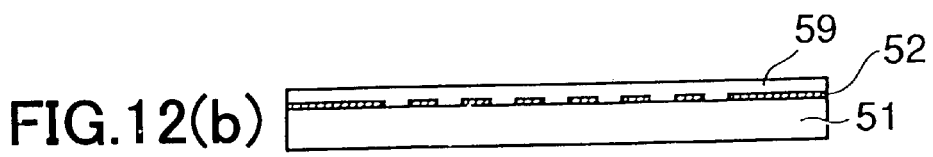
Figure 12C:
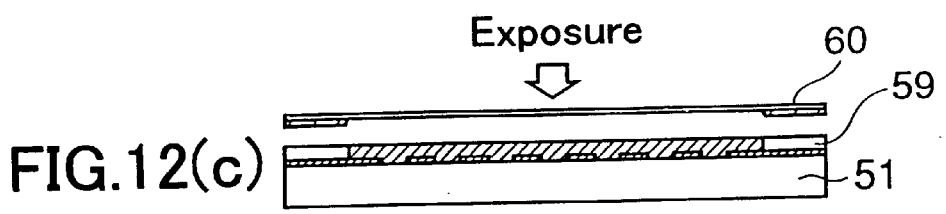
Figure 12D:
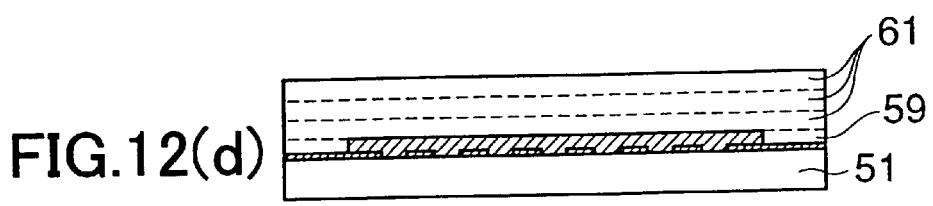
Figure 12E:
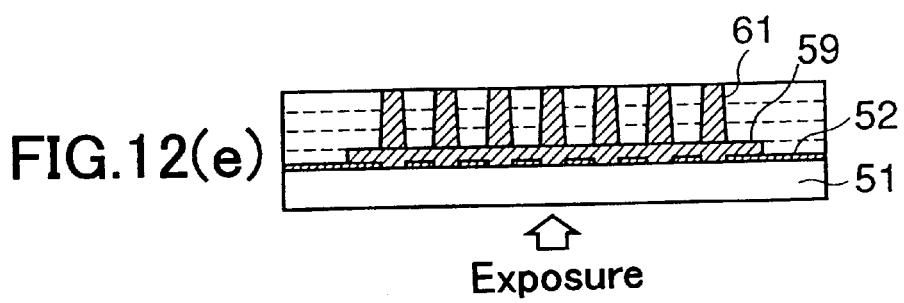
Figure 12F:
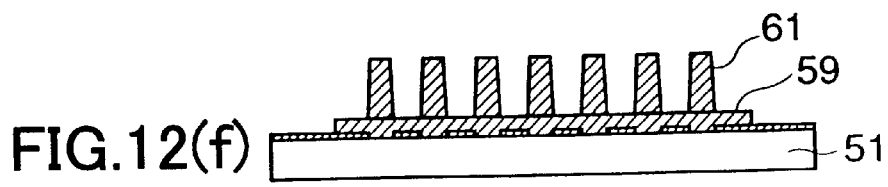
Figure 12G:
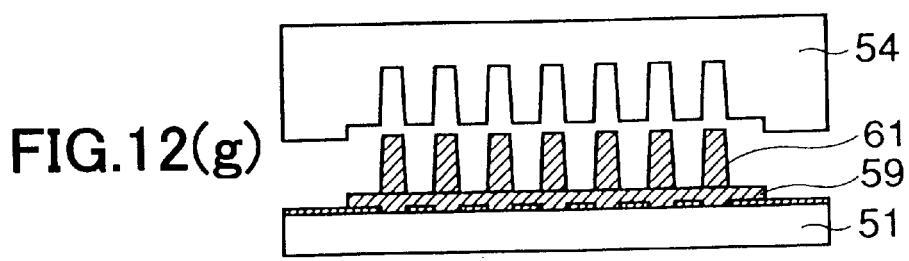

FIGS. 11(*a*) and (*b*) illustrates a modified embodiment of FIGS. 10(*a*) and (*b*), in which the end portions of the rib pattern are connected. Thus, by variously combining the thickness and the number of the photosensitive material layers, and the patterns for exposure, various configurations of the end portions can be realized.

Further, it is possible to produce a master by, after the lowermost photosensitive material layer is entirely exposed from the front surface, laminating another photosensitive material layer thereon, and exposing the photosensitive material layer from the rear surface via a rib pattern, followed by developing, and to use the master for the formation of a transfer mold, thereby improving the transfer property.

That is, as illustrated in FIG. 12, first, a negative-type rib pattern of the light-tight material 52 is formed on the glass substrate 51 (see FIG. 12(*a*)), and a first DFR layer 59 is laminated thereon (see FIG. 12(*b*)). Next, the DFR layer 59 is exposed via a photolithographic mask 60 having a pattern for a foundation of an entire barrier rib surface (see FIG. 12(*c*)) but not developed. A DFR 61 constituted by three layers is laminated thereon (see FIG. 12(*d*)), exposed from the rear surface of the substrate via the pattern of the light-tight material 52 (see FIG. 12(*e*)), and developed (see FIG. 12 (*f*)).

Figure 13:
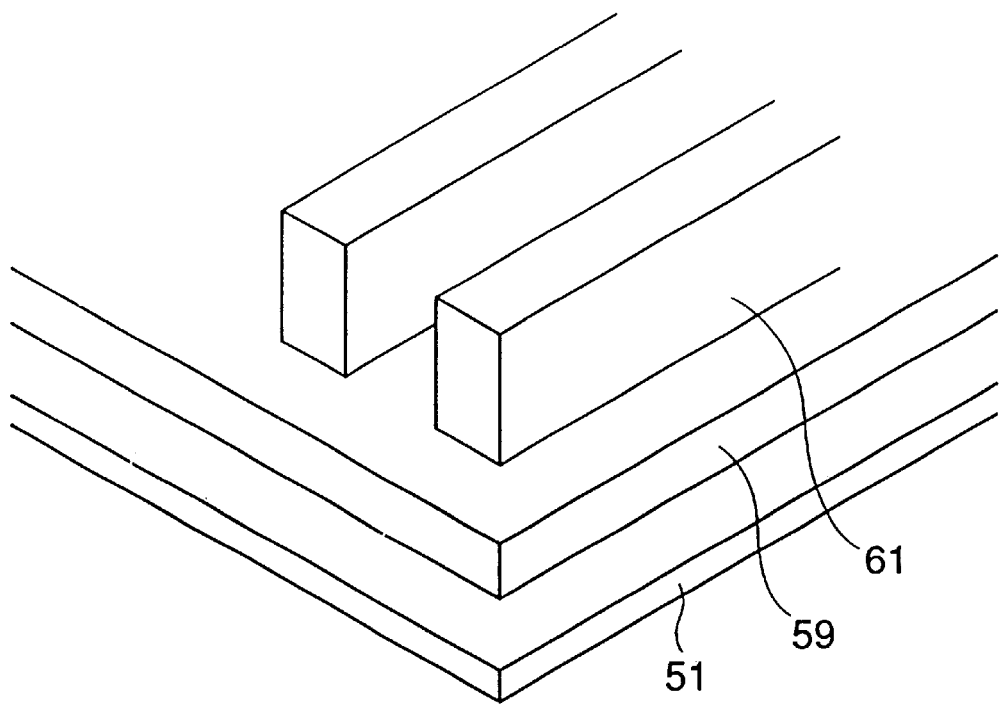
FIG. 13 is an explanatory view illustrating a method of fabricating a master in which the property of transfer is improved.

Thereafter, the master of barrier ribs thus obtained is copied by using a silicone rubber or the like to fabricate a transfer mold 54 (see FIG. 12(*e*)) and then fabricate a master configured as in FIG. 13. By using this master, the transfer property is further improved for the reasons as follows.

That is, a transfer surface contacts the substrate by an area substantially equal to the area of the substrate and therefore the contact area is the largest possible, which enhances the probability in transfer. Also, since the thickness of the foundation forming the bottom portion can be determined by the thickness of the first DFR layer, a transfer material has an improved uniform thickness at the bottom portion and can contact the substrate surely.

Figure 14:
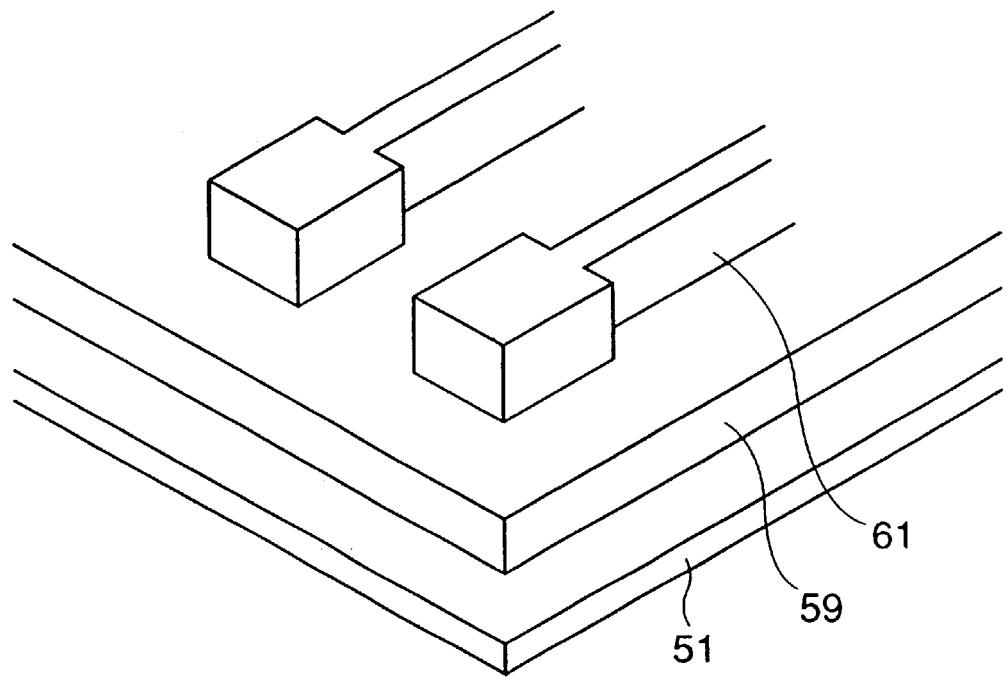
FIG. 14 is an explanatory view illustrating a method of fabricating a master in which the property of transfer is improved.

In order to further improve the release property in the convex portions during the transfer according to this method, the master may be configured as in FIG. 14. Further, the master may be formed such that the three-layered DFR 61 formed on the first DFR layer 59 is configured as in FIG. 10 or 11.

As mentioned hereinabove, the present invention facilitates the production of a master for a barrier rib transfer mold a plasma display panel which has been extremely difficult by machining and the use of a transfer mold fabricated by employing the master enables the barrier ribs of a plasma display panel to be formed accurately and easily.

What is claimed is:

1. A master for a barrier rib transfer mold comprising:
   a light-transmissive substrate having a predetermined pattern formed of a light-tight material on a surface of the substrate and having a photosensitive material layer formed on the pattern; and convex portions in a desired pattern formed on the substrate by exposing the substrate to light from a rear surface of the substrate, followed by developing.

2. A master for a barrier rib transfer mold as set forth in claim 1, wherein the photosensitive material layer comprises a plurality of layers of photosensitive materials having different sensitivities.

3. A master for a barrier rib transfer mold as set forth in claim 1, wherein a reflectance adjustment member is disposed on the photosensitive material layer to adjust a degree of exposure at a desired site of the photosensitive material layer during exposure.

4. A master for a barrier rib transfer mold as set forth in claim 1, wherein the photosensitive material layer comprises a plurality of layers, and the convex portions are formed by forming a first photosensitive material layer on a first pattern of a light-tight material having been formed beforehand on the surface of the substrate; exposing the first photosensitive material layer to light from the rear surface of the substrate; forming a second photosensitive material layer on the first photosensitive material layer as it is without being developed; disposing, on the second photosensitive material layer, a photolithographic mask having a second pattern positionally overlapping the first pattern and exposing the second photosensitive material layer to light; repeating steps after the formation of the second photosensitive material layer a predetermined number of times; and thereafter developing all photosensitive material layers.

5. A master for a barrier rib transfer mold as set forth in claim 4, wherein a translucent filter film is formed in a region of the surface of the substrate where the first pattern is not formed, for adjusting the amount of light during the exposure of the photosensitive material layers.

6. A master for a barrier rib transfer mold as set forth in claim 1, wherein the photosensitive material layer comprises a plurality of layers, and the convex portions are formed by forming a first photosensitive material layer on a first pattern of a light-tight material having been formed beforehand on the surface of the substrate; disposing, on the first photosensitive material layer, a photolithographic mask having a second pattern which positionally overlaps the first pattern and which allows a larger region to be exposed than the first pattern and exposing the first photosensitive material layer to light; forming a second photosensitive material layer on the first photosensitive material layer as it is without being developed; exposing the second photosensitive material layer to light from the rear surface of the substrate; and developing all photosensitive material layers.

7. A method of forming barrier ribs of a plasma display panel comprising: preparing a transfer mold for barrier ribs using a master as set forth in claim 1; filling a barrier rib material in concave portions of the transfer mold and transferring the barrier rib material onto a substrate for a plasma display panel.

8. A method of forming barrier ribs of a plasma display panel as set forth in claim 7 characterized in that the convex portions of the master for a barrier rib transfer mold are formed in a shape such that, when the barrier rib material is transferred using the transfer mold, end portions of barrier ribs have a larger area than main portions of the barrier ribs.

9. A method of forming barrier ribs of a plasma display panel as set forth in claim 7 characterized in that the master for a barrier rib transfer mold is formed in a shape such that its convex portions comprise a plurality of photosensitive material layers, the photosensitive material layers are so formed that a photosensitive material layer situated in an upper tier has a smaller area than a photosensitive material layer situated in a lower tier, and thereby, when the barrier rib material is transferred using the transfer mold, end portions of barrier ribs are lower than main portions of barrier ribs.

10. A method of forming barrier ribs of a plasma display panel as set forth in claim 7 characterized in that the master for a barrier rib transfer mold is formed in a shape such that its convex portions comprise a plurality of photosensitive material layers, the photosensitive material layers are so formed that a photosensitive material layer situated in an upper tier has a smaller area than a photosensitive material layer situated in a lower tier and the photosensitive material layer situated in the lower tier has a larger area in its sites corresponding to end portions of barrier ribs than in its sites corresponding to main portions of barrier ribs, and thereby, when the barrier rib material is transferred using the transfer mold, the end portions of the barrier ribs have a larger area than the main portions of the barrier ribs and the end portions of the barrier ribs are lower than the main portions of the barrier ribs.

11. A method of forming barrier ribs of a plasma display panel as set forth in claim 7 characterized in that the master for a barrier rib transfer mold is formed in a shape such that its convex portions comprise a plurality of photosensitive material layers, the photosensitive material layers are so formed that a photosensitive material layer situated in an upper tier has a smaller area than a photosensitive material layer situated in a lower tier and, in the photosensitive material layer situated in the lower tier, only its sites corresponding to end portions of barrier ribs are continuously connected, and thereby, when the barrier rib material is transferred using the transfer mold, only the end portions of the barrier ribs are continuously connected and the end portions of the barrier ribs are lower than main portions of the barrier ribs.

* * * * *